(12) United States Patent
Matsumura et al.

(10) Patent No.: US 10,274,944 B2
(45) Date of Patent: Apr. 30, 2019

(54) MOTOR CONTROL SYSTEM, CONTROL METHOD, ENCODER, AND MOTOR CONTROLLER

(71) Applicant: Kabushiki Kaisha Yaskawa Denki, Kitakyushu-shi (JP)

(72) Inventors: Isamu Matsumura, Kitakyushu (JP); Junya Hisamatsu, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 0 days.

(21) Appl. No.: 15/788,905

(22) Filed: Oct. 20, 2017

(65) Prior Publication Data

US 2018/0275645 A1 Sep. 27, 2018

(30) Foreign Application Priority Data

Mar. 22, 2017 (JP) .................. 2017-056677

(51) Int. Cl.
*G05B 23/02* (2006.01)
*G01D 5/244* (2006.01)
(Continued)

(52) U.S. Cl.
CPC ..... *G05B 23/0208* (2013.01); *G01D 5/24461* (2013.01); *G01D 5/3473* (2013.01);
(Continued)

(58) Field of Classification Search
CPC ...... H02K 11/215; H02K 11/22; H02K 11/21; H02K 11/33
See application file for complete search history.

(56) References Cited

U.S. PATENT DOCUMENTS

| 4,988,945 A | 1/1991 | Nagase |
| 2010/0164423 A1 | 7/2010 | Nakayama et al. |

(Continued)

FOREIGN PATENT DOCUMENTS

| JP | 63-83612 A | 4/1988 |
| JP | 63-185520 U | 11/1988 |

(Continued)

OTHER PUBLICATIONS

Office Action dated Mar. 13, 2018 in Japanese Patent Application No. 2017-056677 with English translation, 8 pages.

(Continued)

*Primary Examiner* — Karen Masih
(74) *Attorney, Agent, or Firm* — Oblon, McClelland, Maier & Neustadt, L.L.P.

(57) ABSTRACT

A motor control system includes an encoder, and motor control circuitry. The encoder includes a first disk and a second disk which are mounted to a rotation shaft of a motor, a first rotation position detection sensor that detects a rotation position in one rotation of the rotation shaft of the motor from the first disk, a second rotation position detection sensor that detects a rotation position in one rotation of the rotation shaft of the motor from the second disk, and transmission circuitry that transmits first safety data, which includes first rotation position data indicating the rotation position detected by the first rotation position detection sensor and second rotation position data indicating the rotation position detected by the second rotation position detection sensor, and the control circuitry compares the rotation position included in the first rotation position data and the rotation position included in the second rotation position data.

18 Claims, 7 Drawing Sheets

(51) Int. Cl.
| | |
|---|---|
| *G01D 5/347* | (2006.01) |
| *H02K 11/215* | (2016.01) |
| *H02K 11/22* | (2016.01) |
| *H02P 23/18* | (2016.01) |
| *G05B 11/32* | (2006.01) |
| *G05B 19/042* | (2006.01) |

(52) U.S. Cl.
CPC .......... *G05B 11/32* (2013.01); *G05B 19/0428* (2013.01); *H02K 11/215* (2016.01); *H02K 11/22* (2016.01); *H02P 23/186* (2016.02)

(56) References Cited

U.S. PATENT DOCUMENTS

| | | |
|---|---|---|
| 2013/0242289 A1 | 9/2013 | Miyajima et al. |
| 2016/0344267 A1 | 11/2016 | Ogawa et al. |
| 2016/0344429 A1 | 11/2016 | Ogawa et al. |
| 2018/0109166 A1* | 4/2018 | Martin .................. H02K 11/21 |

FOREIGN PATENT DOCUMENTS

| | | |
|---|---|---|
| JP | 2010-152595 A | 7/2010 |
| JP | 2013-195238 A | 9/2013 |

OTHER PUBLICATIONS

Extended European Search Report dated Apr. 19, 2018 in Patent Application No. 17191325.4, 8 pages.

* cited by examiner

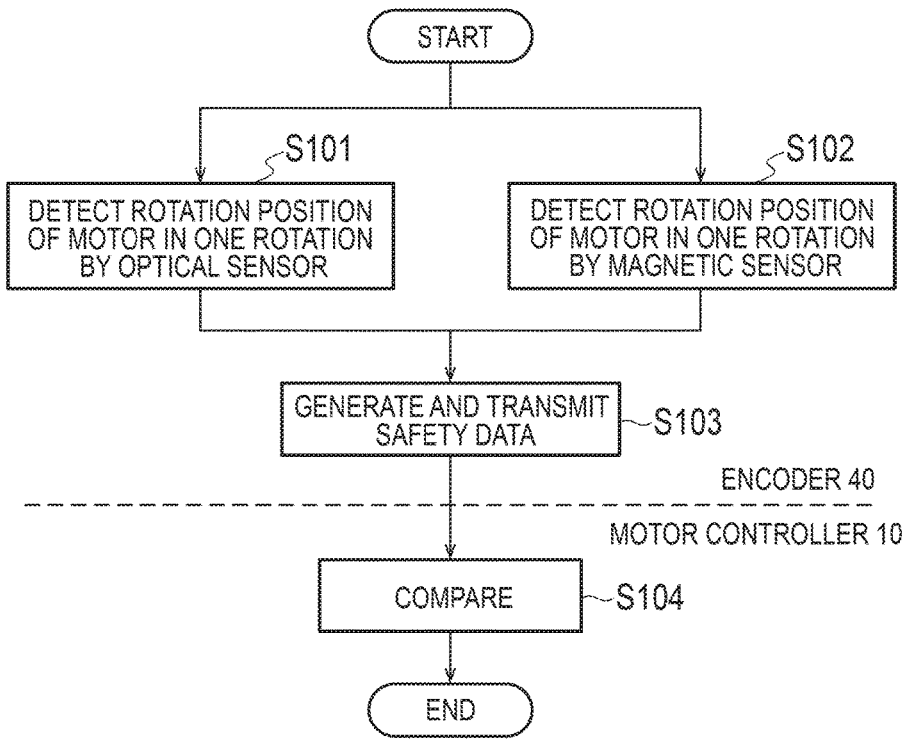
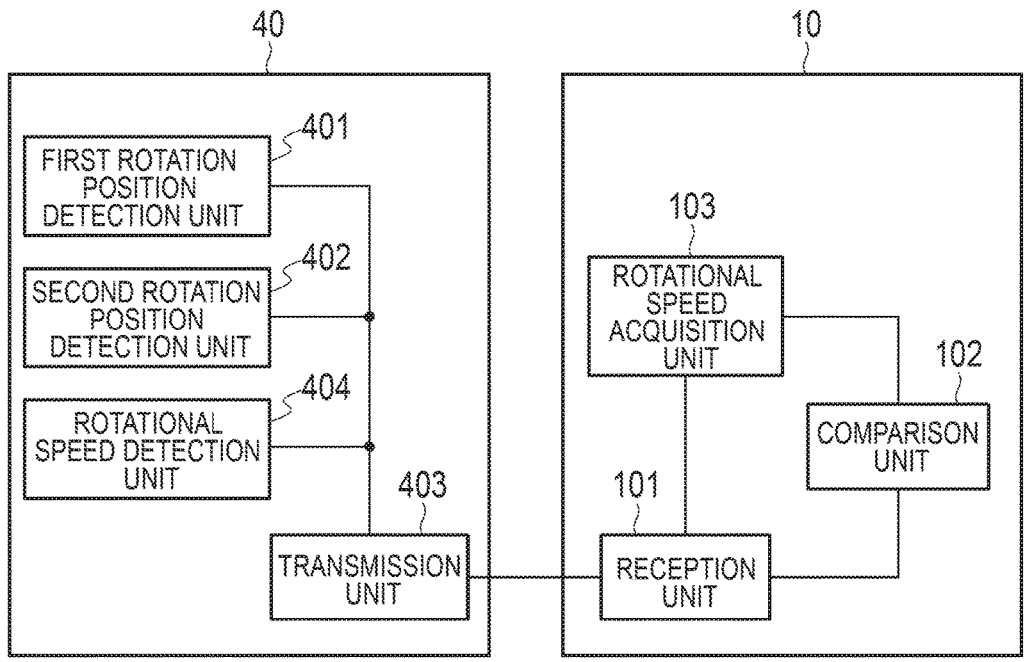

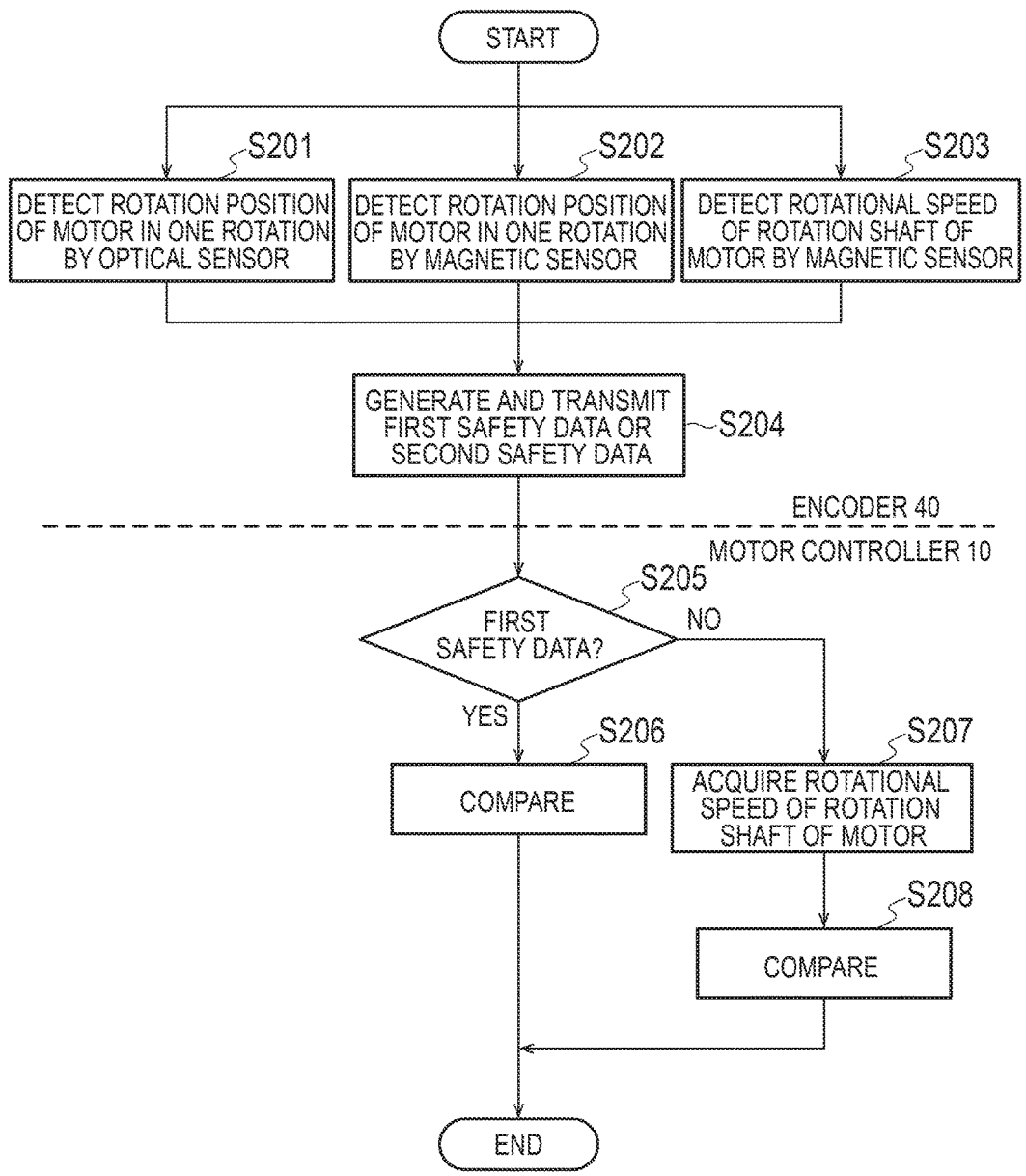

MOTOR CONTROL SYSTEM, CONTROL METHOD, ENCODER, AND MOTOR CONTROLLER

CROSS-REFERENCE TO RELATED APPLICATIONS

The present application is based upon and claims the benefit of priority to Japanese Patent Application No. 2017-056677, filed Mar. 22, 2017, the entire contents of which are incorporated herein by reference.

BACKGROUND

Technical Field

The present disclosure relates to a motor control system, a control method, an encoder, and a motor controller.

Related Art

Conventionally, there has been known a technology for diagnosing whether or not an encoder, which is provided with a detection unit (sensor) for optically detecting a rotation position of a rotation shaft of a motor and a detection unit (sensor) for magnetically detecting a rotation position of the rotation shaft of the motor, is in failure by comparing multi-rotation data items (rotational speeds of the rotation shaft of the motor) generated based on the detected rotation positions (see JP 2010-152595 A, for example).

However, in the conventional technology, an additional encoder is provided separately from the encoder, and the two encoders are physically connected to monitor the reliability in the rotation position of the rotation shaft of the motor. Therefore, the conventional technology entails problems such that physical cost or cost in terms of processing is likely to increase and a system becomes complicated.

The present disclosure is accomplished in view of the foregoing problems, and aims to provide a motor control system, a control method, an encoder, and a motor controller that can reduce a physical size or weight or cost in terms of processing, and can more reliably detect a failure of the encoder with a simple system configuration.

SUMMARY

According to one aspect of the present invention, a motor control system includes an encoder, and motor control circuitry. The encoder includes a first disk and a second disk which are mounted to a rotation shaft of a motor, a first rotation position detection sensor that detects a rotation position in one rotation of the rotation shaft of the motor from the first disk, a second rotation position detection sensor that detects a rotation position in one rotation of the rotation shaft of the motor from the second disk, and transmission circuitry that transmits first safety data, which includes first rotation position data indicating the rotation position detected by the first rotation position detection sensor and second rotation position data indicating the rotation position detected by the second rotation position detection sensor, and the motor control circuitry compares the rotation position included in the first rotation position data and the rotation position included in the second rotation position data.

According to a second aspect of the present invention, a motor control system includes a motor controller and an encoder. The encoder includes a disk mounted to a rotation shaft of a motor, a high resolution position detection unit and a low resolution position detection unit which detects a rotation position in one rotation of the rotation shaft of the motor from the disk, and a transmission unit that transmits first safety data which includes first rotation position data indicating the rotation position detected by the high resolution position detection unit and second rotation position data indicating the rotation position detected by the low resolution position detection unit, and the motor controller includes a comparison unit that compares the rotation position included in the first rotation position data and the rotation position included in the second rotation position data.

According to a third aspect of the present invention, a control method for controlling a motor control system including a motor control circuitry and an encoder includes detecting, at the encoder, a rotation position in one rotation of a rotation shaft of a motor from a first disk mounted to the rotation shaft of the motor, detecting, at the encoder, a rotation position in one rotation of the rotation shaft of the motor from a second disk mounted to the rotation shaft of the motor, transmitting, at the encoder, first safety data, which includes first rotation position data indicating the detected rotation position and second rotation position data indicating the detected rotation position, and comparing, at the motor control circuitry, the rotation position included in the first rotation position data and the rotation position included in the second rotation position data.

According to a fourth aspect of the present invention, a control method for a motor control system including a motor controller and an encoder includes (A) detecting, at the encoder, a rotation position in one rotation of a rotation shaft of a motor from a disk mounted to the rotation shaft of the motor, (B) detecting, at the encoder, a rotation position in one rotation of the rotation shaft of the motor from the disk mounted to the rotation shaft of the motor with resolution lower than resolution for the rotation position detected in the detecting (A), (C) transmitting, at the encoder, first safety data which includes first rotation position data indicating the rotation position detected in the detecting (A) and second rotation position data indicating the rotation position detected in the detecting (B), and (D) comparing, at the motor controller, the rotation position included in the first rotation position data and the rotation position included in the second rotation position data.

According to a fifth aspect of the present invention, an encoder in a motor control system includes a first disk and a second disk which are mounted to a rotation shaft of a motor, a first rotation position detection unit that detects a rotation position in one rotation of the rotation shaft of the motor from the first disk, a second rotation position detection unit that detects a rotation position in one rotation of the rotation shaft of the motor from the second disk, and a transmission unit that transmits, to a motor controller in the motor control system, first safety data which includes first rotation position data indicating the rotation position detected by the first rotation position detection unit and second rotation position data indicating the rotation position detected by the second rotation position detection unit.

According to a sixth aspect of the present invention, an encoder in a motor control system includes a disk mounted to a rotation shaft of a motor, a high resolution position detection unit and a low resolution position detection unit which detects a rotation position in one rotation of the rotation shaft of the motor from the disk, and a transmission unit that transmits, to a motor controller used in the motor control system, first safety data which includes first rotation position data indicating the rotation position detected by the high resolution position detection unit and second rotation position data indicating the rotation position detected by the low resolution position detection unit.

According to a seventh aspect of the present invention, a motor control apparatus including motor control circuitry that receives, from an encoder used in the motor control system, first safety data which includes first rotation position data indicating a rotation position in one rotation of a rotation shaft of a motor detected from a first disk mounted to the rotation shaft of the motor, and second rotation position data indicating a rotation position in one rotation of the rotation shaft of the motor detected from a second disk mounted to the rotation shaft of the motor, and compare the rotation position included in the first rotation position data and the rotation position included in the second rotation position data.

According to an eighth aspect of the present invention, a motor controller in a motor control system includes a reception unit that receives, from an encoder used in the motor control system, first safety data which includes first rotation position data indicating a rotation position in one rotation of a rotation shaft of a motor detected from a disk mounted to the rotation shaft of the motor, and second rotation position data indicating a rotation position in one rotation of the rotation shaft of the motor detected from the disk with resolution lower than resolution for the rotation position included in the first rotation position data; and a comparison unit that compares the rotation position included in the first rotation position data and the rotation position included in the second rotation position data.

The present disclosure provides a motor control system, a control method, an encoder, and a motor controller that can more reliably detect a failure of an encoder.

BRIEF DESCRIPTION OF DRAWINGS

FIG. 4 is a diagram illustrating one example of a flow executed in the motor control system according to one embodiment;

FIG. 5 is a diagram illustrating one example of a functional block of a motor control system according to a first modification;

FIG. 7 is a diagram illustrating one example of a flow executed in the motor control system according to the first modification.

DETAILED DESCRIPTION

Embodiment

Figure 1:
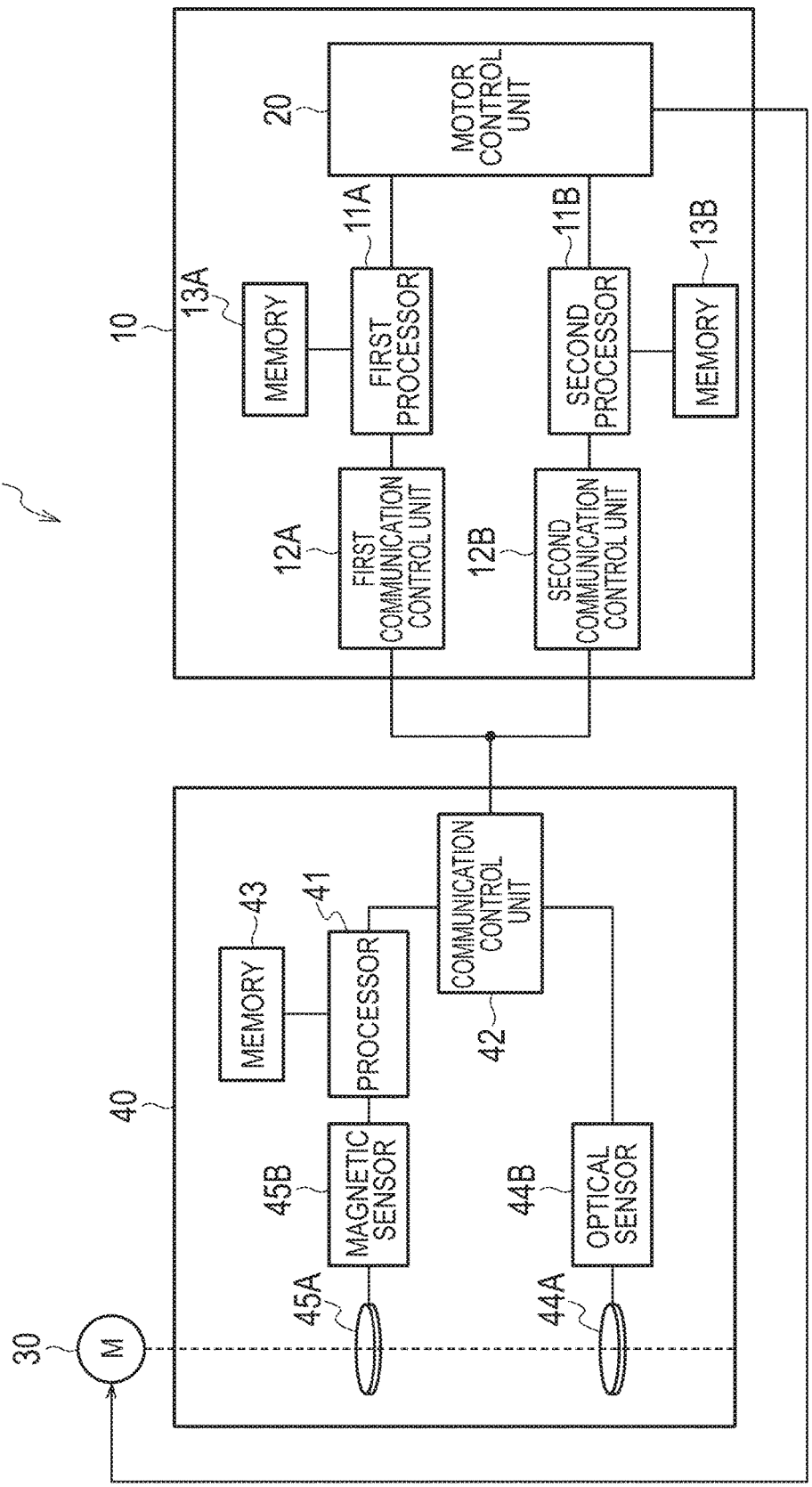
FIG. 1 is a diagram illustrating one example of a physical configuration of a motor control system according to one embodiment.

Hereinafter, one example of a motor control system according to one embodiment in the present disclosure will be described with reference to FIGS. 1 to 4. As illustrated in FIG. 1, a motor control system 1 includes a motor controller 10, a motor control unit 20, a motor 30, and an encoder 40.

The motor controller 10 includes a computer for controlling the entire operation of the motor control system 1. For example, the motor controller 10 is configured to transmit a command to the motor control unit 20 or the encoder 40 at a predetermined timing, or to receive data from the motor control unit 20 or the encoder 40.

The motor controller 10 also includes a first processor 11A, a second processor 11B, a first communication control unit 12A, a second communication control unit 12B, a memory 13A, and a memory 13B, in addition to the motor control unit 20. That is, in the present embodiment, the motor controller 10 includes inside two combinations of a processor and a communication control unit.

Each of the first processor 11A and the second processor 11B may be a general-purpose integrated circuit such as a CPU or a field-programmable gate array (FPGA). The first processor 11A and the second processor 11B may be configured to have a working random access memory (RAM) not illustrated.

Each of the first communication control unit 12A and the second communication control unit 12B is a general communication integrated circuit. For example, each of the first communication control unit 12A and the second communication control unit 12B may be configured by an exclusive integrated circuit such as an application specific integrated circuit (ASIC) or a field-programmable gate array (FPGA). Each of the first communication control unit 12A and the second communication control unit 12B includes a connection port serving as a communication interface for communicating with an external device.

The memory 13A and the memory 13B are general information storage mediums. The memory 13A and the memory 13B are a non-volatile memory such as a read-only memory (ROM), an electrically erasable programmable read-only memory (EEPROM), a flash memory, or a hard disk. The memory 13A and the memory 13B are configured to store programs and various data items.

The motor control unit 20 is a section including a computer and an amplifier for controlling output of current or voltage to the motor 30. The motor controller 10 controlling a servo motor is generally called a servo amplifier. The motor 30 in the present embodiment includes a servo motor, so that the motor controller 10 includes a servo motor controller. Note that the motor control unit 20 may include a processor, a communication control unit, and a memory similar to those in the motor controller 10.

The encoder 40 is a sensor for detecting a position of the motor 30. The encoder 40 may be an incremental encoder or an absolute encoder. The encoder 40 is configured to execute a command received from the motor controller 10 or to transmit the execution result of the command to the motor controller 10.

The encoder 40 includes a processor 41, a communication control unit 42, a memory 43, an optical disk 44A, an optical sensor 44B, a magnetic disk 45A, and a magnetic sensor 45B.

The physical configuration of each of the processor 41, the communication control unit 42, and the memory 43 in the encoder 40 may be the same as that of the first processor 11A (or second processor 11B), the first communication control unit 12A (or second communication control unit 12B), and the memory 13A (or memory 13B in the motor controller 10.

Different from the motor controller 10, the encoder 40 does not have two combinations but has only one combination of the processor and the communication control unit, as illustrated in FIG. 1. It is to be noted that the encoder 40 has two combinations of a disk and a sensor for detecting a position of the motor 30. In other words, in the encoder 40, two disks and two sensors are physically provided, while only one processor and only one communication control unit are physically provided. In addition, each of the processor 41, the communication control unit 42, and the memory 43 in the encoder 40 may have lower performance (for example, the number of clocks) than the first processor 11A (or second processor 11B), the first communication control unit 12A (or second communication control unit 12B), and the memory 13A (or memory 13B in the motor controller 10.

The optical disk 44A is a disk (for example, a first disk) mounted on a rotation shaft of the motor 30. The optical disk 44A is a disk made of glass or metal, for example, and is called a chord wheel. The optical disk 44A has a plurality of slits. The slits are formed at given angular intervals, and transmit light from later-described light-emitting elements from the optical sensor 44B, for example. The number of the slits may be determined according to rotation position (angle) resolution in one rotation of the optical sensor 44B.

The optical sensor 44B is a sensor configured to detect a rotation position of the optical disk 44A in one rotation. In other words, the optical sensor 44B is a rotation position sensor configured to detect a rotation position of the rotation shaft of the motor 30 in one rotation.

The optical sensor 44B is configured to detect a rotation position of the optical disk 44A (that is, the rotation shaft of the motor 30) in one rotation based on light intensity. The optical sensor 44B includes a light-emitting element and a light-receiving element. For example, the light-emitting element is a light-emitting diode, and the light-receiving element is a photodiode. Note that the optical sensor 44B may be of a transmission type that transmits/blocks light passing through the slits on the optical disk 44A located between the light-emitting element and the light-receiving element, or of a reflection type in which the light-emitting element and the light-receiving element are provided on the same side with respect to the slits and the slits reflect or does not reflect light. The optical sensor 44B generates first rotation position data indicating a rotation position of the rotation shaft of the motor 30 in one rotation, and inputs the generated data to the communication control unit 42.

The magnetic disk 45A is a disk (for example, a second disk) mounted on the rotation shaft of the motor 30. The optical disk 44A and the magnetic disk 45A are mounted on the rotation shaft of the same motor 30. Like the optical disk 44A, the magnetic disk 45A is a disk made of glass or metal, for example, and is called a chord wheel. The magnetic disk 45A has at least one magnet or coil. When the magnetic disk 45A is made of ferromagnetic body, the magnetic disk 45A itself may be magnetized.

The magnetic sensor 45B is a sensor configured to detect a rotation position of the magnetic disk 45A in one rotation. In other words, the magnetic sensor 45B is a rotation position sensor configured to detect a rotation position of the rotation shaft of the motor 30 in one rotation.

The magnetic sensor 45B is configured to detect a rotation position of the magnetic disk 45A (that is, the rotation shaft of the motor 30) in one rotation based on a magnetic change. The magnetic sensor 45B includes a magnetic field detection element or a coil, and may be of a magnet type that detects a magnetic change by utilizing a magnet, or may be of a coil type that detects a magnetic change by utilizing a coil. For example, the magnetic field detection element is a Hall element or a magnetoresistive element.

A magnetic field is periodically changed due to the rotation of the magnetic disk 45A. The magnetic sensor 45B is configured to detect a rotation position of the magnetic disk 45A (that is, the rotation shaft of the motor 30) in one rotation based on the periodic change in the magnetic field. The magnetic sensor 45B generates second rotation position data indicating a rotation position of the rotation shaft of the motor 30 in one rotation, and inputs the generated data to the processor 41.

To reduce the size and weight of the encoder 40, the present embodiment employs the optical sensor 44B and the magnetic sensor 45B, instead of a resolver that has a complicated auxiliary circuit and thus has a large size. However, a resolver may be used as a substitute for the optical sensor 44B and the magnetic sensor 45B. In addition, the physical configurations of the motor controller 10 and the encoder 40 are not limited to those described above. The motor controller 10 and the encoder 40 may include other components.

For example, the motor controller 10 may be configured such that the memory 13A and the memory 13B are included respectively in the first processor 11A and the processor 11B, or the encoder 40 has a temperature sensor. Besides, the motor controller 10 or the encoder 40 may include a reading unit (for example, a memory card slot) for reading a computer-readable information storage medium that stores programs or data, for example.

The encoder 40 receives a position acquisition command from the motor controller 10 at predetermined transmission cycles. The transmission cycle is a predetermined period repeating periodically. The transmission cycle may be determined as a parameter in the memory 13A and the memory 13B in the motor controller 10 or in the memory 43 in the encoder 40. In one transmission cycle, a position acquisition command is transmitted and received and transmission data generated by the encoder 40 is transmitted and received, between the motor controller 10 and the encoder 40.

Figure 2:
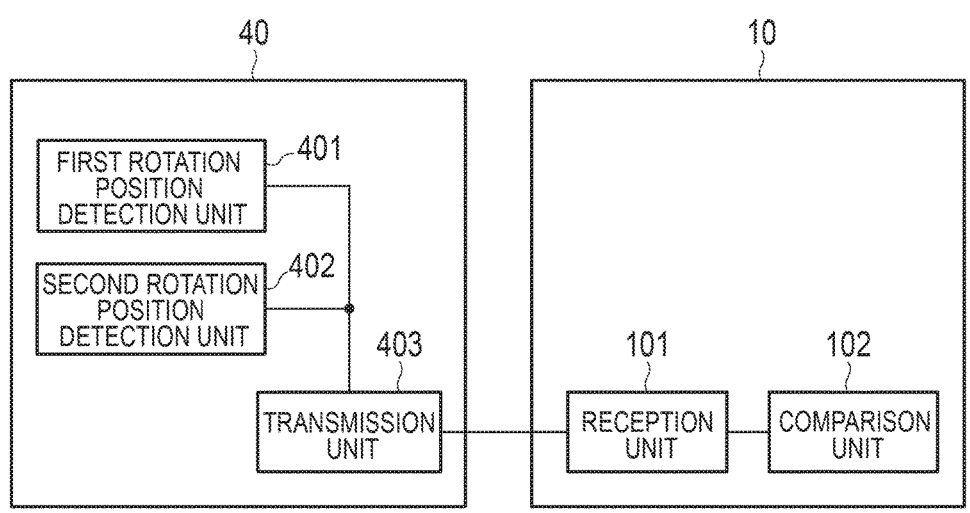
FIG. 2 is a diagram illustrating one example of a functional block of the motor control system according to one embodiment.

FIG. 2 is a functional block diagram of the motor control system 1 according to the present embodiment. Herein, functions of the motor controller 10 and the encoder 40 will be described out of functions implemented by the motor control system 1 according to the present disclosure.

It will be described below that the first processor 11A and the first communication control unit 12A in the motor controller 10 are mainly used, and the second processor 11B and the second communication control unit 12B are supplementarily used. Being supplementarily used means being used to confirm an operation of the encoder 40.

As illustrated in FIG. 2, the motor controller 10 includes a reception unit 101 and a comparison unit 102, and the encoder 40 includes a first rotation position detection unit 401, a second rotation position detection unit 402, and a transmission unit 403.

In the encoder 40, the transmission unit 403 is implemented by the communication control unit 42, the first rotation position detection unit 401 is implemented by the optical sensor 44B, and the second rotation position detection unit 402 is implemented by the magnetic sensor 45B.

Herein, the first rotation position detection unit 401 is configured to detect a rotation position in one rotation of the rotation shaft of the motor 30 from the optical disk (for example, the first disk) 44A.

For example, the first rotation position detection unit 401 may be configured to detect a rotation position in one rotation of the rotation shaft of the motor 30 at a timing at which the encoder 40 receives a position acquisition command, or to detect a rotation position in one rotation of the rotation shaft of the motor 30 at a timing different from the timing at which the encoder 40 receives a position acquisition command.

In addition, the second rotation position detection unit 402 is configured to detect a rotation position in one rotation of the rotation shaft of the motor 30 from the magnetic disk (for example, the second disk) 45A.

For example, the second rotation position detection unit 402 may be configured to detect a rotation position in one rotation of the rotation shaft of the motor 30 at a timing at which the encoder 40 receives a position acquisition command, or to detect a rotation position in one rotation of the rotation shaft of the motor 30 at a timing different from the timing at which the encoder 40 receives a position acquisition command.

The timing at which a rotation position in one rotation of the rotation shaft of the motor 30 is detected by the first rotation position detection unit 401 and the timing at which a rotation position in one rotation of the rotation shaft of the motor 30 is detected by the second rotation position detection unit 402 may be the same or different from each other.

The transmission unit 403 is configured to transmit, at a predetermined timing, safety data (first safety data) including first rotation position data indicating the rotation position in one rotation of the rotation shaft of the motor 30 detected by the first rotation position detection unit 401 and second rotation position data indicating the rotation position in one rotation of the rotation shaft of the motor 30 detected by the second rotation position detection unit 402.

Figure 3:
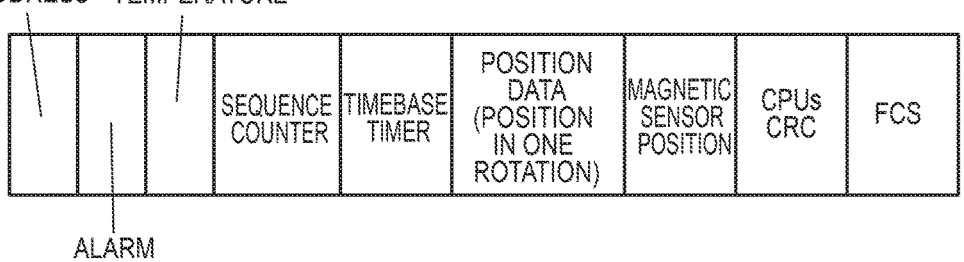
FIG. 3 is a diagram illustrating an example of data storage of safety data used in the motor control system according to one embodiment.

FIG. 3 illustrates an example of data storage of the safety data used in the motor control system 1 according to the present embodiment. The transmission unit 403 is configured to transmit the safety data illustrated in FIG. 3 to the motor controller 10 at a predetermined timing (for example, at every transmission cycle described above).

As illustrated in FIG. 3, a format of the safety data is composed of an "address", an "alarm", a "temperature", a "sequence counter", a "timebase timer", "position data (position in one rotation)", a "magnetic sensor position", "CPUs CRC", and "frame check sequence (FCS)", for example.

The "address" stores an address for uniquely identifying the encoder 40, the "alarm" stores an alarm code indicating the type of an alarm, and the "temperature" stores temperature information of the encoder 40.

The "sequence counter" stores a counter value which is incremented every time the data of the "magnetic sensor position" or the like is updated by the processor 41, and the "timebase timer" stores a time of a timer in the communication control unit 42 when the "position data (position in one rotation)" is updated.

The "position data (position in one rotation)" stores first rotation position data indicating the rotation position in one rotation of the rotation shaft of the motor 30 detected by the first rotation position detection unit 401, and the "magnetic sensor position" stores second rotation position data indicating the rotation position in one rotation of the rotation shaft of the motor 30 detected by the second rotation position detection unit 402.

The "CPUs CRC" stores cyclic redundancy check (CRC) value for detecting errors in data generated by the processor 41.

The "FCS" stores CRC for the entire safety data calculated by the communication control unit 42 (transmission unit 403).

In the motor controller 10, the reception unit 101 is implemented by the first communication control unit 12A and the second communication control unit 12B, and the comparison unit 102 is implemented by the first processor 11A and the second processor 11B.

The reception unit 101 is configured to receive the safety data transmitted from the encoder 40.

The comparison unit 102 is configured to compare the rotation position of the rotation shaft of the motor 30 stored in the "position data (position in one rotation)" (that is, the rotation position in one rotation of the rotation shaft of the motor 30 included in the first rotation position data) and the rotation position of the rotation shaft of the motor 30 stored in the "magnetic sensor position" (that is, the rotation position in one rotation of the rotation shaft of the motor 30 included in the second rotation position data).

For example, the comparison unit 102 may be configured to determine that a failure (fault) occurs in the encoder 40 (that is, the reliability of the rotation position in one rotation of the rotation shaft of the motor 30 detected by the encoder 40 is low), when the difference between the rotation position in one rotation of the rotation shaft of the motor 30 included in the first rotation position data and the rotation position in one rotation of the rotation shaft of the motor 30 included in the second rotation position data is larger than or equal to a predetermined value (or exceeds a predetermined value).

Next, one example of a process flow executed by the motor control system 1 according to the present embodiment will be described with reference to FIG. 4.

As illustrated in FIG. 4, in step S101, the encoder 40 detects a rotation position in one rotation of the rotation shaft of the motor 30 from the optical disk (for example, the first disk) 44A.

In step S102, the encoder 40 detects a rotation position in one rotation of the rotation shaft of the motor 30 from the magnetic disk (for example, the second disk) 45A. Note that either of the processes in step S101 and step S102 may be executed first, or the processes in step S101 and step S102 may be simultaneously executed.

In step S103, the encoder 40 generates safety data including the first rotation position data indicating the detected rotation position in one rotation of the rotation shaft of the motor 30 and the second rotation position data indicating the detected rotation position in one rotation of the rotation shaft of the motor 30, and transmits the safety data to the motor controller 10.

In step S104, the motor controller 10 compares, based on the received safety data, the rotation position of the rotation shaft of the motor 30 stored in the "position data (position in one rotation)" (that is, the rotation position in one rotation of the rotation shaft of the motor 30 included in the first rotation position data) and the rotation position of the rotation shaft of the motor 30 stored in the "magnetic sensor position" (that is, the rotation position in one rotation of the rotation shaft of the motor 30 included in the second rotation position data), and determines whether or not a failure (fault) occurs in the encoder 40 (that is, determines the reliability of the rotation position in one rotation of the rotation shaft of the motor 30 detected by the encoder 40).

According to the motor control system 1 in the present embodiment, a fault in the encoder 40 can more reliably be detected with low cost without physically connecting two encoders 40 (that is, without connecting an external encoder to the encoder 40), whereby the motor 30 can more safely be controlled.

(First Modification)

Hereinafter, a motor control system 1 according to a first modification will be described with reference to FIGS. 5 to 7, focusing on a difference from the motor control system 1 in the above-mentioned embodiment.

As illustrated in FIG. 5, in the motor control system 1 according to the present modification, the motor controller 10 further includes a rotational speed acquisition unit 103, and the encoder 40 further includes a rotational speed detection unit 404.

The rotational speed acquisition unit 103 in the motor controller 10 is implemented by the first processor, and the rotational speed detection unit 404 is implemented by the processor 41 in the encoder 40.

The rotational speed detection unit 404 is configured to detect a rotational speed of the rotation shaft of the motor 30 from the magnetic disk (for example, the second disk) 45A. That is, the rotational speed detection unit 404 may be configured to detect the rotational speed of the rotation shaft of the motor 30 on the basis of the rotation position in one rotation of the rotation shaft of the motor 30 detected by the second rotation position detection unit 402.

Figure 6A:
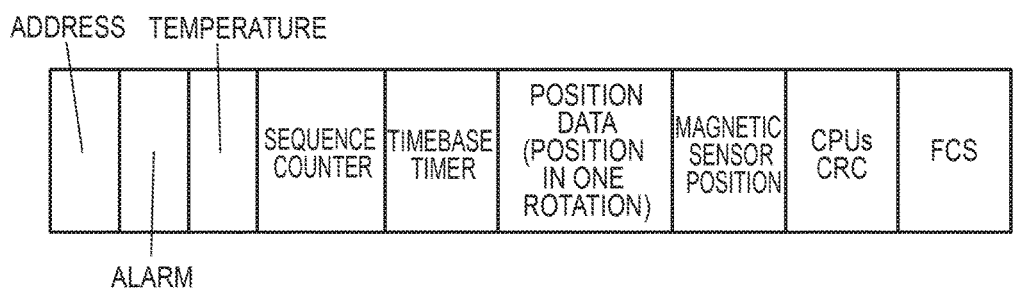
FIGS. 6A and 6B are diagrams illustrating an example of data storage of safety data used in the motor control system according to the first modification.
Figure 6B:
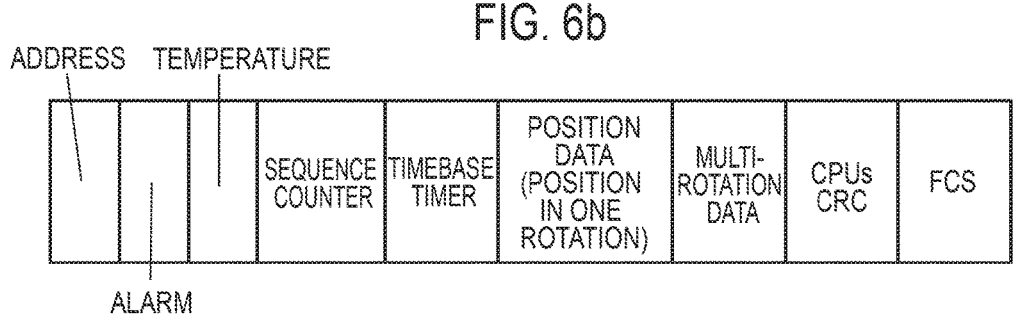

In addition, the transmission unit 403 is configured to transmit either one of safety data (first safety data) illustrated in FIG. 6A and safety data (second safety data) illustrated in FIG. 6B according to a predetermined rule.

For example, the transmission unit 403 may be configured to transmit the safety data illustrated in FIG. 6A and the safety data illustrated in FIG. 6B in an alternating manner in a predetermined cycle, or to transmit the safety data illustrated in FIG. 6B N times after transmitting the safety data illustrated in FIG. 6A M times (M and N are an integer).

The format of the safety data illustrated in FIG. 6A is the same as the format of the safety data illustrated in FIG. 3. The format of the safety data illustrated in FIG. 6B has "multi-rotation data" in place of the "magnetic sensor position" in the safety data illustrated in FIG. 6A.

The "multi-rotation data" stores rotational speed data indicating the rotational speed of the rotation shaft of the motor 30 detected by the rotational speed detection unit 404.

In addition, the rotational speed acquisition unit 103 is configured to acquire the rotation position of the rotation shaft of the motor 30 stored in the "position data (position in one rotation)" (that is, acquire the rotational speed of the rotation shaft of the motor 30 based on the rotation position of the rotation shaft of the motor 30 included in the first rotation position data), when the safety data illustrated in FIG. 6B is received by the reception unit 101.

The comparison unit 102 is configured to compare the rotation position of the rotation shaft of the motor 30 stored in the "position data (position in one rotation)" (that is, the rotation position included in the first rotation position data) and the rotation position of the rotation shaft of the motor 30 stored in the "magnetic sensor position" (that is, the rotation position of the rotation shaft of the motor 30 included in the second rotation position data), when the reception unit 101 receives the safety data (first safety data) illustrated in FIG. 6A.

On the other hand, the comparison unit 102 is configured to compare the rotational speed of the rotation shaft of the motor 30 acquired by the rotational speed acquisition unit 103 and the rotational speed of the rotation shaft of the motor 30 stored in the "multi-rotation data" (that is, the rotational speed of the rotation shaft of the motor 30 included in the rotational speed data), when the reception unit 101 receives the safety data (second safety data) illustrated in FIG. 6B.

Next, one example of a process flow executed by the motor control system 1 according to the present modification will be described with reference to FIG. 7.

As illustrated in FIG. 7, in step S201, the encoder 40 detects a rotation position in one rotation of the rotation shaft of the motor 30 from the optical disk (for example, the first disk) 44A.

The encoder 40 detects a rotation position in one rotation of the rotation shaft of the motor 30 from the magnetic disk (for example, the second disk) 45A in step S202, and detects the rotational speed of the rotation shaft of the motor 30 from the magnetic disk (for example, the second disk) 45A in step S203. Note that either of the processes in step S201 and step S202 may be executed first, or the processes in step S201 and step S202 may be simultaneously executed.

In step S204, the encoder 40 generates safety data (first safety data) including the first rotation position data indicating the detected rotation position in one rotation of the rotation shaft of the motor 30 and the second rotation position data indicating the detected rotation position in one rotation of the rotation shaft of the motor 30, or safety data (second safety data) including the first rotation position data indicating the detected rotation position in one rotation of the rotation shaft of the motor 30 and the rotation data indicating the detected rotational speed of the rotation shaft of the motor 30, and transmits the generated data to the motor controller 10.

In step S205, the motor controller 10 determines whether or not the received safety data is the safety data (first safety data) illustrated in FIG. 6A. If "Yes", this process proceeds to step S206, and if "No", this process proceeds to step S207.

In step S206, the motor controller 10 compares the rotation position of the rotation shaft of the motor 30 stored in the "position data (position in one rotation)" (that is, the rotation position included in the first rotation position data) and the rotation position of the rotation shaft of the motor 30 stored in the "magnetic sensor position" (that is, the rotation position of the rotation shaft of the motor 30 included in the second rotation position data), and determines whether or not a failure (fault) occurs in the encoder 40 (that is, determines the reliability of the rotation position in one rotation of the rotation shaft of the motor 30 detected by the encoder 40).

In step S207, the motor controller 10 acquires the rotation position of the rotation shaft of the motor 30 stored in the "position data (position in one rotation)" (that is, acquires the rotational speed of the rotation shaft of the motor 30 based on the rotation position of the rotation shaft of the motor 30 included in the first rotation position data).

In step S208, the motor controller 10 compares the acquired rotational speed of the rotation shaft of the motor 30 and the rotational speed of the rotation shaft of the motor 30 stored in the "multi-rotation data" (that is, the rotational speed of the rotation shaft of the motor 30 included in the rotational speed data), and determines whether or not a failure (fault) occurs in the encoder 40 (that is, determines the reliability of the rotation position in one rotation of the rotation shaft of the motor 30 detected by the encoder 40).

According to the motor control system 1 in the present first modification, a fault in the encoder 40 can be detected not only through comparison between rotation positions of the rotation shaft of the motor 30 but also through comparison between the rotational speed of the rotation shaft of the motor 30 and the rotation position in one rotation of the rotation shaft of the motor 30, as in a conventional encoder, whereby the motor 30 can be more flexibly controlled.

(Second Modification)

Hereinafter, a motor control system 1 according to a second modification will be described with reference to FIG. 8, focusing on a difference between the motor control system 1 according to the second modification and the motor control system in the above-mentioned embodiment.

Figure 8:
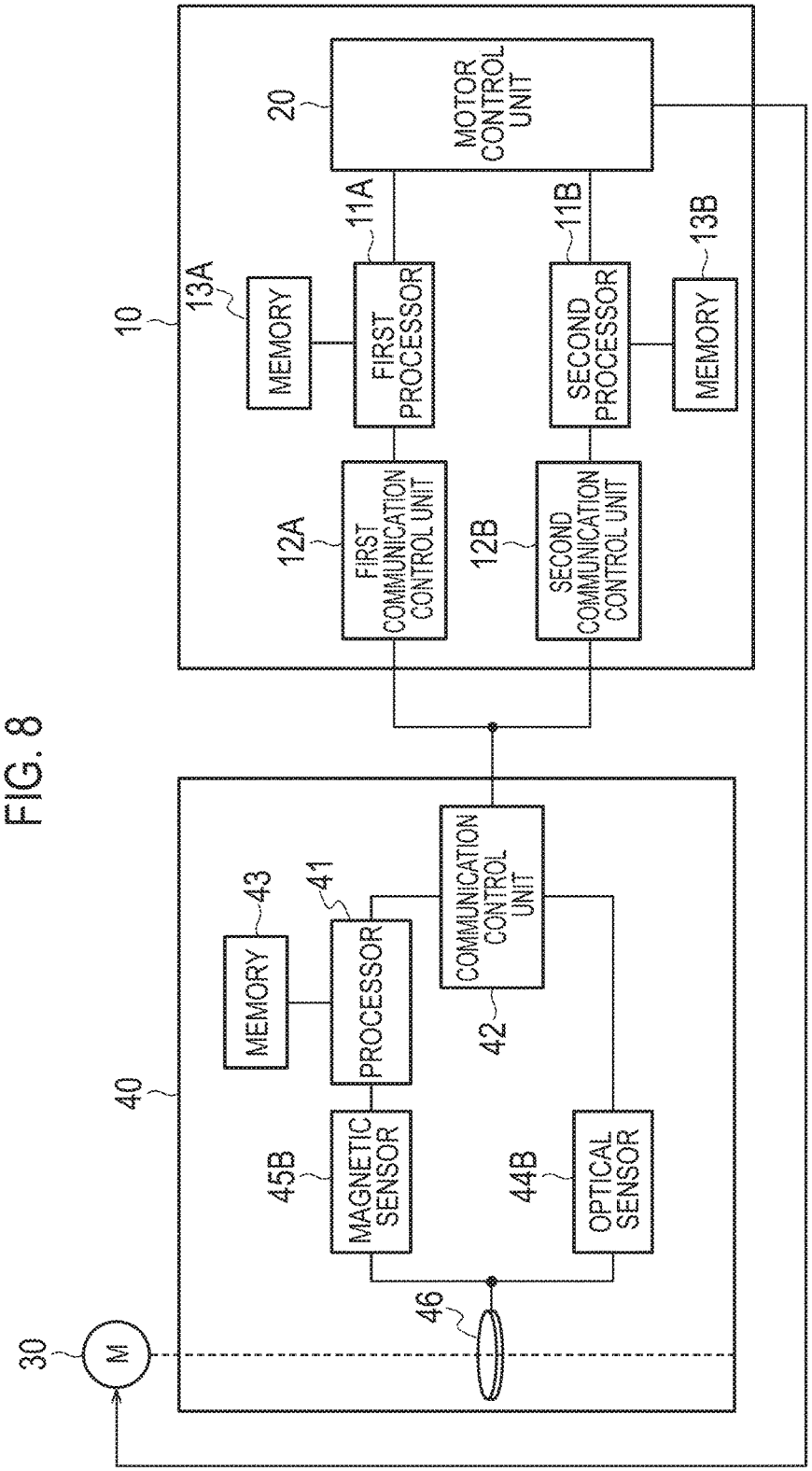
FIG. 8 is a diagram illustrating one example of a physical configuration of a motor control system according to a second modification.

As illustrated in FIG. 8, in the motor control system 1 according to the second modification, a disk 46 has both the function of the optical disk 44A and the function of the magnetic disk 45A. In addition, an optical sensor 44B and a magnetic sensor 45B are connected to the disk 46.

The optical sensor 44B functions as a high-resolution position detection unit configured to detect a rotation position in one rotation of the rotation shaft of the motor 30 from the disk, and the magnetic sensor 45B functions as a low-resolution position detection unit configured to detect a rotation position in one rotation of the rotation shaft of the motor 30 from the disk. That is, the rotation position in one rotation of the rotation shaft of the motor 30 detected by the optical sensor 44B has higher resolution than the rotation position in one rotation of the rotation shaft of the motor 30 detected by the magnetic sensor 45B.

What is claimed is:

1. A motor control system, comprising:
   an encoder; and
   motor control circuitry,
   wherein the encoder includes a first disk and a second disk which are mounted to a rotation shaft of a motor, a first rotation position detection sensor configured to detect a rotation position in one rotation of the rotation shaft of the motor from the first disk, a second rotation position detection sensor configured to detect a rotation position in one rotation of the rotation shaft of the motor from the second disk, and transmission circuitry configured to transmit first safety data, which includes first rotation position data indicating the rotation position detected by the first rotation position detection sensor and second rotation position data indicating the rotation position detected by the second rotation position detection sensor, and
   wherein the motor control circuitry is configured to compare the rotation position included in the first rotation position data and the rotation position included in the second rotation position data.

2. The motor control system according to claim 1, wherein the motor control circuitry is further configured to control the motor based on the comparison between the rotation position included in the first rotation position data and the rotation position included in the second rotation position data.

3. The motor control system according to claim 1, wherein the encoder further includes a rotational speed detection sensor configured to detect a rotational speed of the rotation shaft from the second disk, the transmission circuitry is further configured to transmit, according to a predetermined rule, one of the first safety data and second safety data, which includes the first rotation position data and rotational speed data indicating the rotational speed, the motor control circuitry further includes a rotational speed acquisition sensor configured to determine a rotational speed of the rotation shaft based on the rotation position included in the first rotation position data, compare the rotation position included in the first rotation position data and the rotation position included in the second rotation position data, when receiving the first safety data, and compare the rotational speed determined by the rotational speed acquisition sensor and the rotational speed included in the rotational speed data, when receiving the second safety data.

4. The motor control system according to claim 1, wherein the first disk is an optical disk, and the second disk is a magnetic disk.

5. The motor control system according to claim 3, wherein the first disk is an optical disk, and the second disk is a magnetic disk.

6. The motor control system according to claim 1, wherein the motor control circuitry is configured to compare the rotation position included in the first rotation position data and the rotation position included in the second rotation position data to determine whether a fault occurred in the motor.

7. A control method for controlling a motor control system including a motor control circuitry and an encoder, the control method comprising:
   detecting, at the encoder, a rotation position in one rotation of a rotation shaft of a motor from a first disk mounted to the rotation shaft of the motor;
   detecting, at the encoder, a rotation position in one rotation of the rotation shaft of the motor from a second disk mounted to the rotation shaft of the motor;
   transmitting, at the encoder, first safety data, which includes first rotation position data indicating the detected rotation position and second rotation position data indicating the detected rotation position; and
   comparing, at the motor control circuitry, the rotation position included in the first rotation position data and the rotation position included in the second rotation position data.

8. The control method according to claim 7, further comprising:
   controlling the motor based on the comparison between the rotation position included in the first rotation position data and the rotation position included in the second rotation position data.

9. The control method according to claim 7, further comprising:
   detecting a rotational speed of the rotation shaft from the second disk;
   transmitting, according to a predetermined rule, one of the first safety data and second safety data, which includes the first rotation position data and rotational speed data indicating the rotational speed;
   determining a rotational speed of the rotation shaft based on the rotation position included in the first rotation position data;
   comparing the rotation position included in the first rotation position data and the rotation position included in the second rotation position data, when receiving the first safety data; and
   comparing the acquired rotational speed and the rotational speed included in the rotational speed data, when receiving the second safety data.

10. The control method according to claim 7, wherein the first disk is an optical disk, and the second disk is a magnetic disk.

11. The control method according to claim 9, wherein the first disk is an optical disk, and the second disk is a magnetic disk.

12. The control method according to claim 7, further comprising:
   comparing the rotation position included in the first rotation position data and the rotation position included in the second rotation position data to determine whether a fault occurred in the motor.

13. A motor control apparatus comprising:
motor control circuitry configured to
receive, from an encoder used in the motor control system, first safety data which includes first rotation position data indicating a rotation position in one rotation of a rotation shaft of a motor detected from a first disk mounted to the rotation shaft of the motor, and second rotation position data indicating a rotation position in one rotation of the rotation shaft of the motor detected from a second disk mounted to the rotation shaft of the motor, and
compare the rotation position included in the first rotation position data and the rotation position included in the second rotation position data.

14. The motor control apparatus according to claim 13, wherein the motor control circuitry is further configured to control the motor based on the comparison between the rotation position included in the first rotation position data and the rotation position included in the second rotation position data.

15. The motor control apparatus according to claim 13, wherein the encoder further includes a rotational speed detection sensor configured to detect a rotational speed of the rotation shaft from the second disk, transmission circuitry of the encoder is configured to transmit, according to a predetermined rule, one of the first safety data and second safety data, which includes the first rotation position data and rotational speed data indicating the rotational speed, the motor control circuitry further includes a rotational speed acquisition sensor configured to determine a rotational speed of the rotation shaft based on the rotation position included in the first rotation position data, compare the rotation position included in the first rotation position data and the rotation position included in the second rotation position data, when receiving the first safety data, and compare the rotational speed determined by the rotational speed acquisition sensor and the rotational speed included in the rotational speed data, when receiving the second safety data.

16. The motor control apparatus according to claim 13, wherein the first disk is an optical disk, and the second disk is a magnetic disk.

17. The motor control apparatus according to claim 15, wherein the first disk is an optical disk, and the second disk is a magnetic disk.

18. The motor control apparatus according to claim 13, wherein the motor control circuitry is configured to determine that a fault occurred in the motor when a difference between the rotation position included in the first rotation position data and the rotation position included in the second rotation position data is equal to or greater than a predetermined value.

* * * * *